US008745299B2

(12) United States Patent
Zer et al.

(10) Patent No.: US 8,745,299 B2
(45) Date of Patent: *Jun. 3, 2014

(54) COMBINATION NON-VOLATILE MEMORY AND INPUT-OUTPUT CARD WITH DIRECT MEMORY ACCESS

(75) Inventors: Aviad Zer, Kfar Vradim (IL); Yosi Pinto, Palo Alto, CA (US); Micky Holtzman, Kfar Vradim (IL); Yoram Cedar, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/268,287

(22) Filed: Oct. 7, 2011

(65) Prior Publication Data

US 2012/0030398 A1 Feb. 2, 2012

Related U.S. Application Data

(63) Continuation of application No. 10/302,009, filed on Nov. 21, 2002, now Pat. No. 8,037,229.

(51) Int. Cl.
*G06F 13/36* (2006.01)
*G06F 13/28* (2006.01)

(52) U.S. Cl.
CPC ...................................... *G06F 13/28* (2013.01)
USPC ............................................ 710/308; 710/22

(58) Field of Classification Search
CPC .... G06F 13/385; G06F 13/28; G06F 13/4031
USPC ............. 710/301, 302, 305, 22–29, 306–315, 710/110
See application file for complete search history.

(56) References Cited

U.S. PATENT DOCUMENTS

| 4,455,620 A | 6/1984 | Watanabe et al. |
| 4,458,313 A | 7/1984 | Suzuki et al. |
| 4,614,144 A | 9/1986 | Sagara et al. |

(Continued)

FOREIGN PATENT DOCUMENTS

| DE | 4416583 | 7/1995 |
| DE | 198 55 596 | 6/2000 |

(Continued)

OTHER PUBLICATIONS

"Palm Brand Products to Feature Secure Digital (SD) Card Slot for Expansion", SD Card Association—Press Room, dated Jun. 27, 2000, 4 pages.

(Continued)

*Primary Examiner* — Raymond Phan
(74) *Attorney, Agent, or Firm* — Brinks Gilson & Lione

(57) ABSTRACT

A removable electronic circuit card having both a memory module with a non-volatile mass storage memory and a separate input-output module so that data transfers may be made through the input-output module directly to and from the mass storage memory in a direct memory access (DMA) type transfer when the card is inserted into the host system but without having to pass the data through the host system. Once the host gives a DMA command, the data transfer is accomplished independently of the host system, except for the host supplying power and possibly a clock signal and other like support, during such a data transfer directly with card. The data for the transfer can be communicated between the input-output module and the exterior device through either wireless or an electrical connection means.

11 Claims, 7 Drawing Sheets

(56) References Cited

U.S. PATENT DOCUMENTS

| | | |
|---|---|---|
| 4,882,473 A | 11/1989 | Bergeron et al. |
| 4,882,476 A | 11/1989 | White |
| 5,067,075 A | 11/1991 | Sugano et al. |
| 5,155,663 A | 10/1992 | Harase |
| 5,375,037 A | 12/1994 | Le Roux |
| 5,375,084 A | 12/1994 | Begun et al. |
| 5,434,872 A | 7/1995 | Petersen et al. |
| 5,438,359 A | 8/1995 | Aoki |
| 5,457,601 A | 10/1995 | Georgopulos et al. |
| 5,486,687 A | 1/1996 | Le Roux |
| 5,513,074 A | 4/1996 | Ainsbury et al. |
| 5,563,400 A | 10/1996 | Le Roux |
| 5,606,559 A | 2/1997 | Badger et al. |
| 5,655,917 A | 8/1997 | Kaneshige et al. |
| 5,677,524 A | 10/1997 | Haghiri-Tehrani |
| 5,727,168 A | 3/1998 | Inoue et al. |
| 5,733,800 A | 3/1998 | Moden |
| 5,742,910 A | 4/1998 | Gallant et al. |
| 5,752,857 A | 5/1998 | Knights |
| 5,764,896 A | 6/1998 | Johnson |
| 5,778,195 A | 7/1998 | Gochi |
| 5,780,837 A | 7/1998 | Garcia |
| 5,780,925 A | 7/1998 | Cipolla et al. |
| 5,784,633 A | 7/1998 | Petty |
| 5,802,325 A | 9/1998 | Le Roux |
| 5,809,520 A | 9/1998 | Edwards et al. |
| 5,822,190 A | 10/1998 | Iwasaki |
| 5,831,256 A | 11/1998 | De Larminat et al. |
| 5,831,533 A | 11/1998 | Kanno |
| 5,837,984 A | 11/1998 | Bleier et al. |
| 5,852,290 A | 12/1998 | Chaney |
| 5,877,488 A | 3/1999 | Klatt et al. |
| 5,887,145 A | 3/1999 | Harari et al. |
| 5,909,596 A | 6/1999 | Mizuta |
| 5,928,347 A | 7/1999 | Jones |
| 5,933,328 A | 8/1999 | Wallace et al. |
| 5,974,496 A | 10/1999 | Miller |
| 5,975,584 A | 11/1999 | Vogt |
| 5,987,557 A | 11/1999 | Ebrahim |
| 6,040,622 A | 3/2000 | Wallace |
| 6,062,480 A | 5/2000 | Evoy |
| 6,062,887 A | 5/2000 | Schuster et al. |
| 6,069,795 A | 5/2000 | Klatt et al. |
| 6,075,706 A | 6/2000 | Learmonth et al. |
| 6,097,605 A | 8/2000 | Klatt et al. |
| 6,125,409 A | 9/2000 | Le Roux |
| 6,134,631 A | 10/2000 | Jennings, III |
| 6,137,710 A | 10/2000 | Iwasaki et al. |
| 6,140,695 A | 10/2000 | Tandy |
| 6,145,046 A | 11/2000 | Jones |
| 6,151,511 A | 11/2000 | Cruciani |
| 6,151,652 A | 11/2000 | Kondo et al. |
| 6,175,517 B1 | 1/2001 | Jigour et al. |
| 6,182,204 B1 | 1/2001 | Nakashima |
| 6,199,756 B1 | 3/2001 | Kondo et al. |
| 6,202,109 B1 | 3/2001 | Salo et al. |
| 6,226,202 B1 | 5/2001 | Kikuchi |
| 6,240,301 B1 | 5/2001 | Phillips |
| 6,244,894 B1 | 6/2001 | Miyashita |
| 6,266,724 B1 | 7/2001 | Harari et al. |
| 6,279,114 B1 | 8/2001 | Toombs et al. |
| 6,311,296 B1 | 10/2001 | Congdon |
| 6,353,870 B1 | 3/2002 | Mills et al. |
| 6,381,662 B1 | 4/2002 | Harari et al. |
| 6,385,677 B1 | 5/2002 | Yao et al. |
| 6,405,278 B1 | 6/2002 | Liepe |
| 6,421,246 B1 | 7/2002 | Schremmer |
| 6,434,648 B1 | 8/2002 | Assour et al. |
| 6,438,638 B1 | 8/2002 | Jones et al. |
| 6,446,177 B1 | 9/2002 | Tanaka et al. |
| 6,457,647 B1 | 10/2002 | Kurihashi et al. |
| 6,496,381 B1 | 12/2002 | Groeger |
| 6,499,016 B1 | 12/2002 | Anderson |
| 6,524,137 B1 | 2/2003 | Liu et al. |
| 6,612,498 B1 | 9/2003 | Lipponen et al. |
| 6,651,131 B1 | 11/2003 | Chong et al. |
| 6,665,190 B2 | 12/2003 | Clayton et al. |
| 6,669,487 B1 | 12/2003 | Nishizawa et al. |
| 6,676,420 B1 | 1/2004 | Liu et al. |
| 6,687,778 B2 | 2/2004 | Ito et al. |
| 6,745,247 B1 | 6/2004 | Kawan et al. |
| 6,748,457 B2 | 6/2004 | Fallon et al. |
| 6,764,017 B2 | 7/2004 | Chen et al. |
| 6,816,933 B1 | 11/2004 | Andreas |
| 6,820,148 B1 | 11/2004 | Cedar et al. |
| 6,832,281 B2 | 12/2004 | Jones et al. |
| 6,842,652 B2 | 1/2005 | Yeung |
| 6,842,818 B2 | 1/2005 | Okamoto et al. |
| 6,845,421 B2 | 1/2005 | Hwang et al. |
| 6,862,604 B1 | 3/2005 | Spencer et al. |
| 6,886,083 B2 | 4/2005 | Murakami |
| 6,945,461 B1 | 9/2005 | Hien et al. |
| 7,042,899 B1 | 5/2006 | Vaida et al. |
| 7,055,752 B2 | 6/2006 | Yoshimoto et al. |
| 7,071,975 B2 | 7/2006 | Myojo |
| 7,137,011 B1 | 11/2006 | Harari et al. |
| 8,037,229 B2 | 10/2011 | Zer |
| 2001/0001507 A1 | 5/2001 | Fukuda et al. |
| 2001/0021956 A1 | 9/2001 | Okamoto et al. |
| 2001/0042149 A1 | 11/2001 | Ito et al. |
| 2001/0052038 A1 | 12/2001 | Fallon et al. |
| 2002/0103988 A1 | 8/2002 | Dornier |
| 2003/0056050 A1 | 3/2003 | Moro |
| 2003/0074529 A1 | 4/2003 | Crohas |
| 2003/0084221 A1 | 5/2003 | Jones et al. |
| 2003/0163623 A1 | 8/2003 | Yeung |
| 2004/0103234 A1 | 5/2004 | Zer et al. |
| 2004/0201745 A1 | 10/2004 | Wess et al. |
| 2005/0107987 A1 | 5/2005 | Barr et al. |

FOREIGN PATENT DOCUMENTS

| | | |
|---|---|---|
| EP | 02/19266 | 12/1991 |
| EP | 0495216 | 12/1991 |
| EP | 495216 | 9/1992 |
| EP | 495216 | 9/1993 |
| EP | 0 657 834 | 6/1995 |
| EP | 0 891 047 | 1/1999 |
| EP | 2771199 | 5/1999 |
| EP | 1 001 348 | 5/2000 |
| EP | 1037159 | 9/2000 |
| EP | 1074906 | 2/2001 |
| EP | 1085516 | 3/2001 |
| EP | 1278154 | 1/2003 |
| GB | 2374204 | 10/2002 |
| JP | 60234286 | 11/1985 |
| JP | 3195052 | 8/1991 |
| JP | 5-89304 | 4/1993 |
| JP | 5089304 | 4/1993 |
| JP | 6103429 | 4/1994 |
| JP | 6223241 | 8/1994 |
| JP | 6231318 | 8/1994 |
| JP | 7094658 | 4/1995 |
| JP | 2001282712 | 10/2001 |
| JP | 2001-307801 | 11/2001 |
| JP | 2002245428 | 8/2002 |
| JP | 2003196624 | 7/2003 |
| NL | 9301540 | 4/1995 |
| WO | WO 00/70553 | 11/2000 |
| WO | WO 00/70554 | 11/2000 |
| WO | WO 01/84490 | 11/2001 |
| WO | WO 02/13021 | 2/2002 |
| WO | WO 02/15020 | 2/2002 |
| WO | WO 02/19266 | 3/2002 |
| WO | WO 2004/095365 | 3/2004 |
| WO | WO 2004/044755 | 5/2004 |
| WO | WO 2004/049177 | 6/2004 |

OTHER PUBLICATIONS

"Hard disk drive", Wikipedia, p. 1.
"Data storage device", Wikipedia, p. 1.
"Non-volatile storage", FOLDOC—Free On-Line Dictionary of Computing, May 22, 2000, p. 1.

(56) References Cited

OTHER PUBLICATIONS

"Mass storage" from encyclopedia2.thefreedictionary, source: FreeMcGraw-Hill Dictionary of Scientific & Technical Terms, 6E, 2003, p. 1.
"Identification Cards—Integrated Circuit(s) Cards with Contracts—Part I: Physical Characteristics," ISO/IEC 78/0—Second Edition, pp. 1-5, Aug. 1995.
"Information Technology—Identification Cards—Integrated Circuit(s) Cards with Contracts—Part 2: Dimensions and Location of the Contracts," ISO-IEC 7816-2 First Edition, pp. 1-5, Mar. 1, 1999.
"Information Technology—Identification Cards—Integrated Circuit(s) Cards with Contracts—Part 1: Electronic Signals and Transmission Protocols," ISO-IEC 7816-3 Second Edition, pp. 1-27, Dec. 15, 1997.
SanDisk MultiMedia Product Manual, Rev. 2 .Copyrgt. 2000 SanDisk Corporation, pp. 2-86.
MultiMediaCard System Specification Version 3.1 Official Release .Copyrgt. Jan. 2000 MMCA Technical Committee, pp. 2-123.
"Palm Brand Products to Feature Secure Digital (SD) Card Slot for Expansion," SD Card Association—Press Room, www.sdcard.org/press7.htm, dated Jun. 27, 2000, 4 pages.
Notification of Transmittal of the International Search Report and the Written Opinion of the International Searching Authority, or the Declaration, International Application No. PCT/US2004/040952 for SanDisk Corporation, mailed Apr. 29, 2005, 11 pages.
ETSI, "Ditigal Cellular Telecommunications System (Phase 2+); Specification of the Subscriber Identity Module—Mobile Equipment (SIM-ME) Interface," GSM 11.11 Version 8.3.0 Release 1999, ETSI TS 100 977 V8.3.0 (Aug. 2000), pp. 1-170.
CompactFlash Association, "CF+ and CompactFlash Specification Revision 1.4", Jul. 1999, pp. 1-105.
"Identification Cards—Integrated Circuit(s) Cards with Contacts: Part 10: Electronic Signals and Answer to Reset for Synchronous Cards," International Standard, ISO/IEC 7816-10, Nov. 1, 1999, 13 pages.
MMCA Technical Committee, "The MultiMediaCard System Specification, Version 3.1", Jun. 2001, pp. 1-130.
"Olympus Camedia; Accessories at a Glance", http://www.bicos.de/media/Olympus-Zubeh%F6r.pdf, Sep. 9, 2002, 18 pages.
"Communication Relating to the Results of the Partial International Search", European Patent Office, International Searching Authority, related to corresponding application PCT/US03/35325, Jul. 2, 2004, 6 pages.
European Patent Office, International Searching Authority, "Partial International Search," from related PCT/US2004/007782, dated Oct. 8, 2004, 4 pages.
SD Group, "SD Memory Card Specifications, Simplified Version of: Part I Physical Layer Specification, Version 1.01," Apr. 15, 2001, pp. 1-32.
International Search Report for PCT/US01/27362, dated Feb. 25, 2002, 3 pages.
"Identification Cards—Integrated Circuit(s) Cards with Contracts—Part 1: Physical Characteristics," ISO/IEC 7816-1 First Edition, pp. 1-3, Oct. 15, 1998.
Wilson, James Y., et al., "Inside Bluetooth—Part 1, "Dr. Dobb's Journal, pp. 62-70, Mar. 2000.
Wilson, James Y., et al., "Inside Bluetooth—Part 2,"Dr. Dobb's Journal, pp. 58-64, Apr. 2000.
MultiMediaCard System Specification Version 2.11 Official Release .Copyrgt. Jun. 1999 MMCA Technical Committee, pp. 2-123.
ISA/EPO, "International Search Report," mailed in related PCT/US03/35325, mailed Oct. 13, 2004, 9 pages.
"Olympus Camedia; Accessories at a Glance", http://www.bicos.de/media/Olympus-Zubeh%F6r.pdf, May 6, 2004, 18 pages.
EPO/ISA, "International Search Report and Written Opinion," mailed Oct. 13, 2004 in corresponding PCT/US2004/007782, 15 pages.
"Partial International Search Report," EPO International Searching Authority, mailed Aug. 10, 2004 in corresponding PCT Application No. PCT/US2004/007782, 4 pages.
"MultiMedia Card Product Manual, Revision 2," SanDisk Corporation, Apr. 2000, pp. 1-86.
"Identification Cards—Physical Characteristics," ISO/IEC 7810 International Standard, Aug. 15, 1995, pp. 1-5.
"Information Technology—Identification Cards—Integrated Circuit(s) Cards with Contacts, Part 3: Electronic Signals and Transmission Protocols," ISO/IEC 7816-3 International Standard, 1997, pp. 1-27.
"Information Technology—IdentificationCards—Integrated Circuit(s) Cards with Contacts, Part 2: Dimensions and Location of the Contacts," ISO/IEC 7816-2 International Standard, 19997, pp. 1-5.
Office Action for U.S. Appl. No. 10/418,910 mailed Oct. 14, 2005, 17 pages.
Office Action for U.S. Appl. No. 10/075,438 mailed Jan. 24, 2006, 9 pages.
Office Action for U.S. Appl. No. 10/741,147 mailed Nov. 23, 2005, 25 pages.
Office Action for U.S. Appl. No. 10/293,985 mailed Jan. 9, 2006, 15 pages.
Office Action for U.S. Appl. No. 10/732,149 mailed Aug. 1, 2005.
MultiMediaCard System Specification Version 2.2 Official Release .Copyrgt. Jan. 2000 MMCA Technical Committee, pp. 2-123.
Office Action for U.S. Appl. No. 10/741,147 mailed Nov. 27, 2006, 17 pages.
Office Action for U.S. Appl. No. 10/741,147 mailed Jul. 25, 2006, 18 pages.
International Search Report mailed Feb. 11, 2004.
International Search Report and Written Opinion issued in PCT/US2004/040122, mailed on Apr. 1, 2005 (7 pages).
Office Action for U.S. Appl. No. 10/732,149 Mailed Feb. 14, 2006, 31 pages.
Office Action directed against U.S. Appl. No. 10/741,147, 17 pages, mailed Aug. 6, 2008.

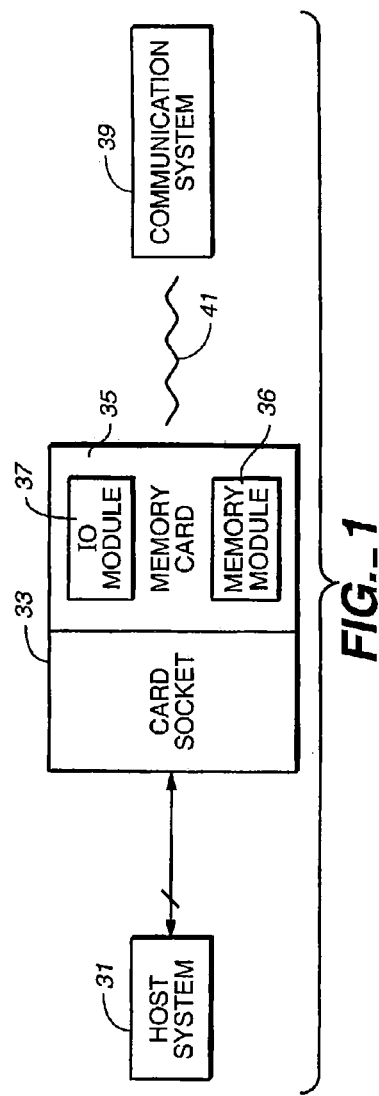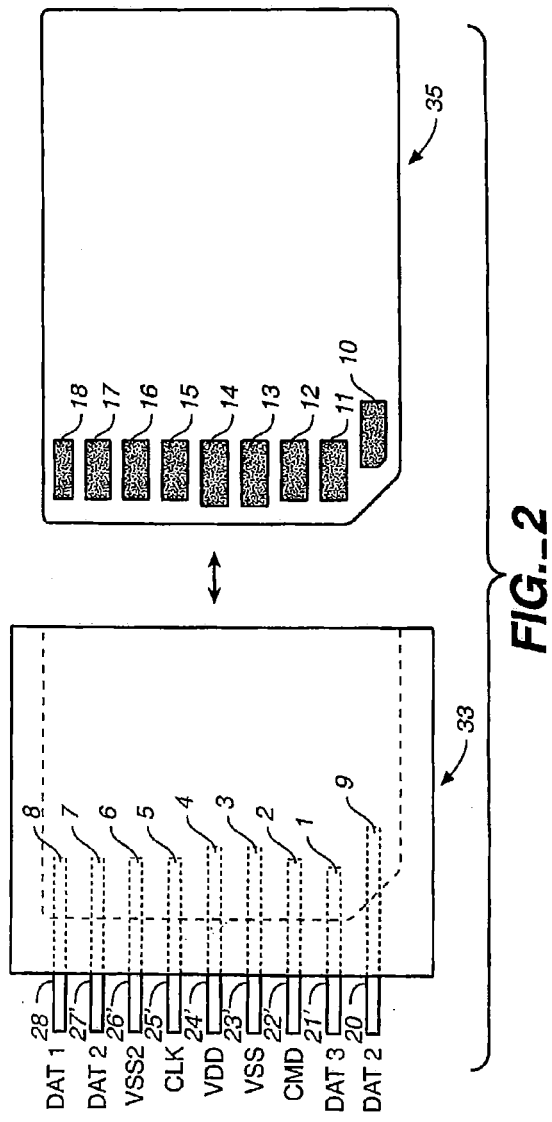
FIG._1
FIG._2

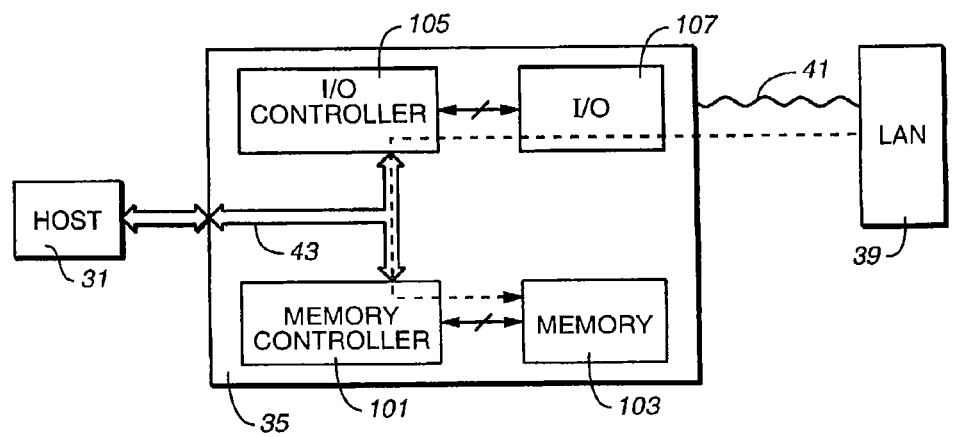
FIG._3
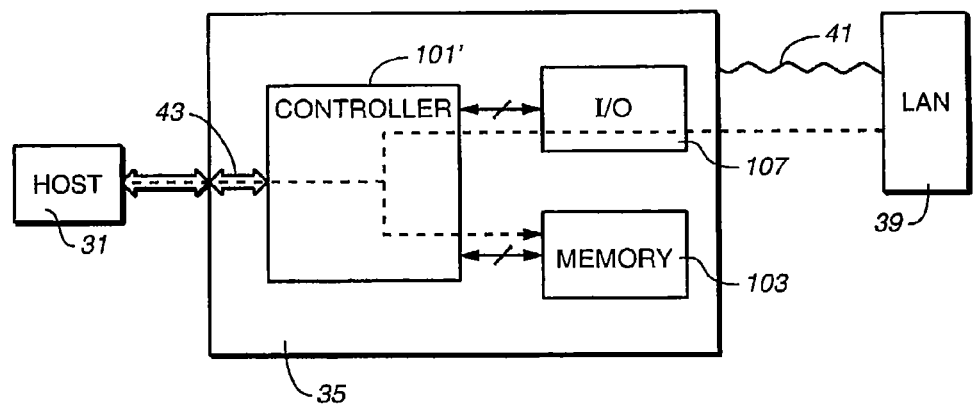
FIG._5

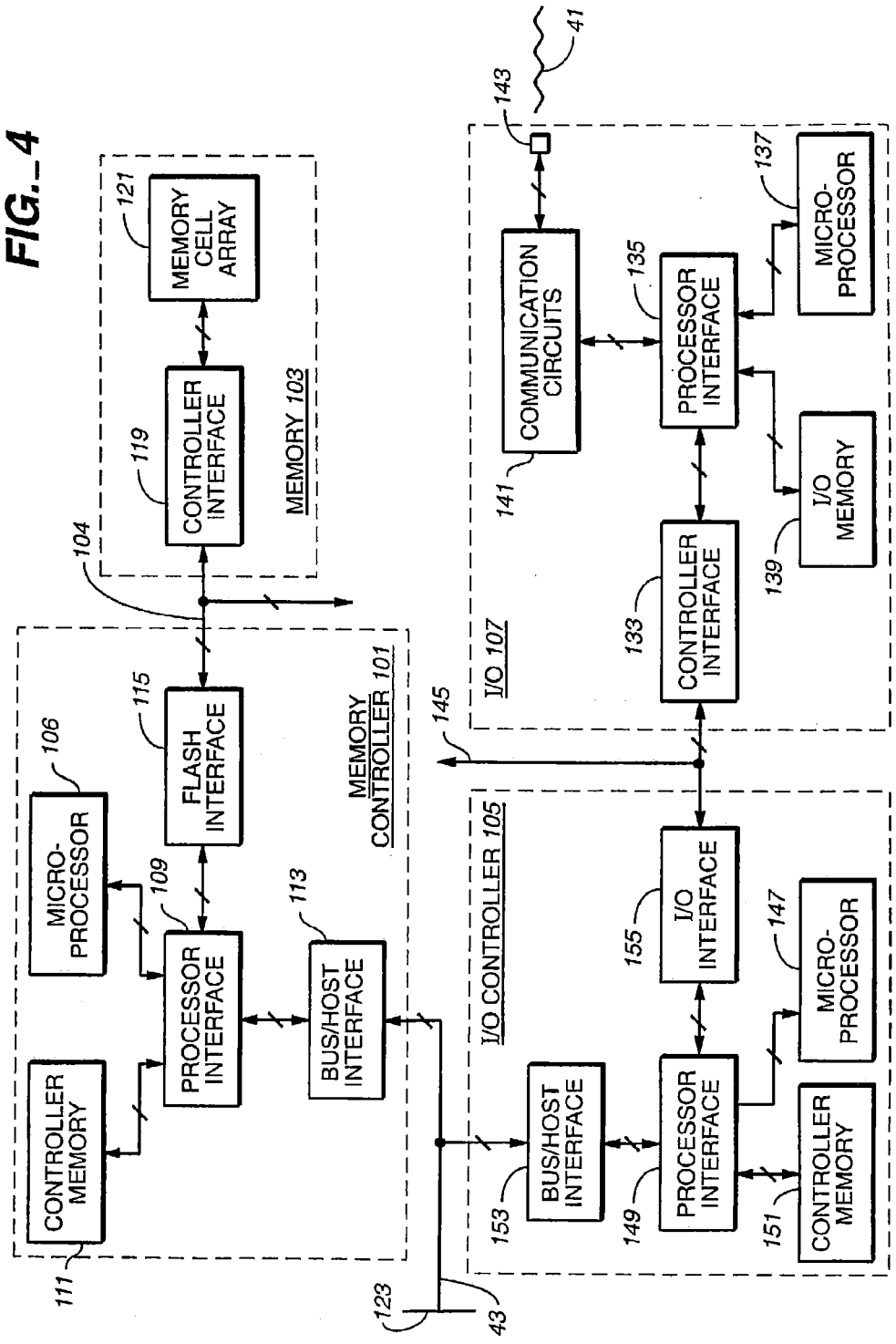
FIG._4

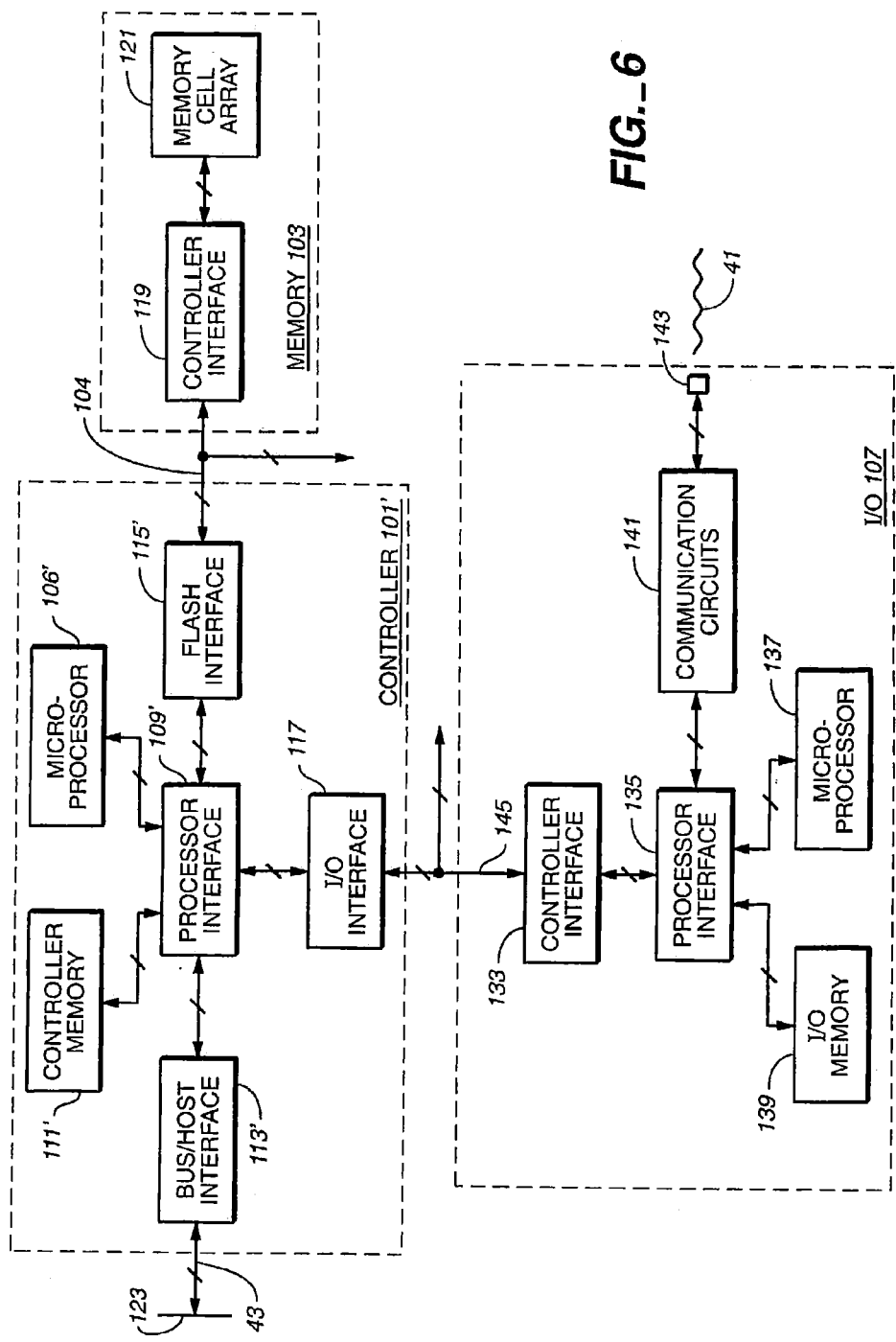

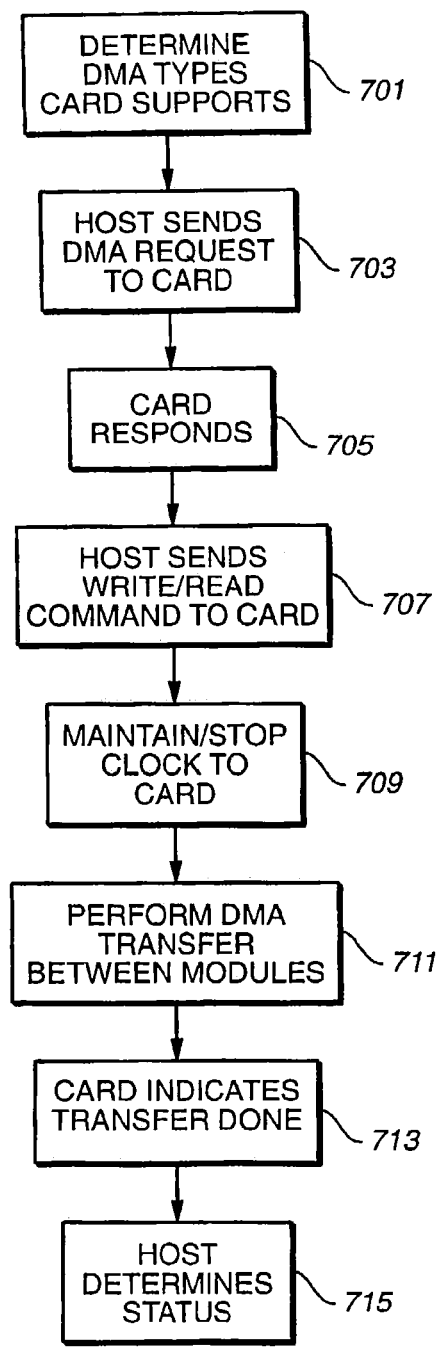
FIG._7

| S | D | Command Index | DMA Direction | IO Function Number | OP Code | IO Register Address | Block Count | Stuff Bit '0' | CRC 7 | E |
|---|---|---|---|---|---|---|---|---|---|---|
| 1 | 1 | 6 | 1 | 3 | 1 | 17 | 9 | 1 | 7 | 1 |

FIG._8

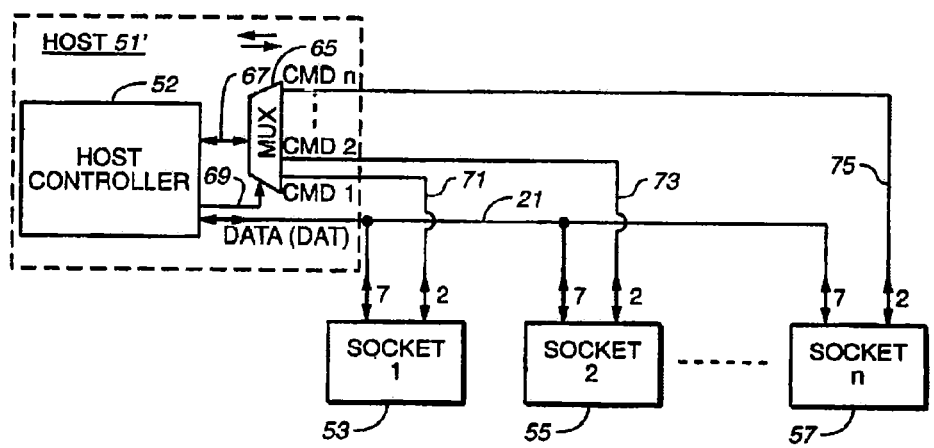
FIG._9

COMBINATION NON-VOLATILE MEMORY AND INPUT-OUTPUT CARD WITH DIRECT MEMORY ACCESS

CROSS-REFERENCE TO RELATED APPLICATION

This application is a continuation of U.S. patent application Ser. No. 10/302,009, filed Nov. 21, 2002 now U.S. Pat. No. 8,037,229, which is hereby incorporated by reference.

BACKGROUND OF THE INVENTION

This invention relates, generally, to the use and structure of removable electronic circuit cards and, more specifically, to cards having both a non-volatile memory module and an input-output ("I/O") module.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, Calif., assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, Calif. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation, and capacities of 128 megabytes are expected to be available in the near future. These products are described in a "MultiMediaCard Product Manual," Revision 2, dated April 2000, published by SanDisk corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. Certain aspects of the SD card are described in U.S. patent application Ser. No. 09/641,023, filed Aug. 17, 2000, which application is incorporated herein by this reference.

Cards made according to the ISO/IEC 7816 standard are of a different shape, have surface contacts in different positions, and a different electrical interface than the MMC and SD Cards. The ISO/IEC 7816 standard has the general title of "Identification cards—Integrated Circuit(s) Cards with Contacts," and consists of parts 1-10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

Currently, data is transferred between the memory card and some external device through the host system to which the memory card is connected. Not all host systems with which such memory cards are used are particularly adapted to so transfer certain types or large amounts of data in a fast, efficient and convenient manner.

SUMMARY OF THE INVENTION

Therefore, the present invention, briefly and generally, utilizes a removable electronic circuit card having both a memory module with a non-volatile mass storage memory and a separate input-output module so that data transfers may be made through the input-output module directly to and from the mass storage memory in a direct memory access (DMA) type transfer when the card is inserted into the host system but without having to pass the data through the host system. Once the host gives a DMA command, the data transfer is accomplished independently of the host system, except for the host supplying power and possibly a clock signal and other like support, during such a data transfer directly with the card. The controller structure of a memory card is modified so that is can also act as a controller to such a DMA transfer between the memory module and the input-output module. The data for the transfer can be communicated between the input-output module and the exterior device through either wireless or an electrical connection means. For example, the input-output module can have an antenna or other type of transceiver.

The introduction of a DMA mechanism between the input-output module and memory module in a single card has a number of advantages. Since the host only initiates the data transfer, it can have a minimum involvement in the actual data transfer, and hence it can deal with other tasks while the input-output and memory modules transfer data amongst themselves. Also, as the bus can be idle during the data transfer, power consumption is reduced. Additionally, the DMA mechanism requires less command and response transaction, and thus the data transfer becomes faster than in the traditional way.

In a first set of embodiments, the memory module and input-output module each have their own controller for individually communicating with the host through the card's bus. In this case, the DMA transfer can use this bus and a clock signal is supplied from the host. In a second set of embodiments, a single controller is used for both modules and the DMA transfer uses a path distinct from the bus used by the controller to transfer data and commands to and from the host.

Additional details, features and advantages of the present invention will become apparent from the following description, which should be taken in conjunction with the accompanying drawings.

BRIEF DESCRIPTION OF THE DRAWINGS

FIG. 1 illustrates a system in which a combination card of a non-volatile memory module and an input-output module are utilized;

FIG. 2 shows the pin assignments of an example card and system socket in which the card is inserted;

FIG. 3 is a block diagram of the operation of a first embodiment of the cards of FIGS. 1 and 2;

FIG. 4 is a more detailed electronic block diagram of the card of FIG. 3;

FIG. 5 is a block diagram of the operation of a second embodiment of the cards of FIGS. 1 and 2;

FIG. 6 is a more detailed electronic block diagram of the card of FIG. 5;

FIG. 7 is a flow chart describing the DMA operation of the present invention;

FIG. 8 is a table showing an exemplary command structure; and

FIG. 9 shows a memory system utilizing multiple memory card sockets with multiple command/response lines connected to them.

DESCRIPTION OF SPECIFIC EMBODIMENTS

With reference to FIG. 1, a host electronic system 31 is illustrated to include a socket 33 into which one or more types of commercially available removable electronic circuit card, such as the memory cards summarized in the Background above, may be inserted and removed by the user. The socket 33 may be built into the host 31 or physically separate and connected by a cable or cableless means. The host 31 may be a personal computer, in desktop or notebook form, which includes the socket 33 that receives such a card. Other examples of host systems containing such a card socket include various portable electronic devices, such as hand held computers, personal organizers, other personal digital assistants ("PDAs"), cellular telephones, music players, and the like. Additionally, auto radios and global position system ("GPS") receivers also can have such a memory card socket. The improvements of the present invention have application to a wide variety of host systems that include a memory card socket.

In the examples described herein, the SD card is described but it will be understood that the invention is not limited to implementation with any specific type of removable electronic circuit card. In FIG. 2, the physical configuration of a SD card 35 and a mating socket 33 are shown. The SD card is rectangular in shape, having dimensions of 24 millimeters by 32 millimeters, with a thickness of 2.1 millimeters and narrow rails (not shown in FIG. 2) along the longer sides of the card that are 1.4 millimeters thick. The present invention may be implemented with a card having one of a wide variety of sizes but has a high degree of usefulness with cards that are less than 50 millimeters in length, 40 millimeters in width and 3 millimeters in thickness.

The SD card 35 contains nine surface electrical contacts 10-18. Contacts 13, 14 and 16 are connected to power ($V_{SS}$, $V_{DD}$ and $V_{SS2}$) when inserted into the host system socket 33. Card contact 15 receives a clock signal (CLK) from the host. Contact 12 receives commands (CMD) from the host and sends responses and status signals back to the host. The remaining contacts 10, 11, 17 and 18 (DAT 2, DAT 3, DAT 0 and DAT 1, respectively) receive data in parallel for storage in its non-volatile memory and send data to the host in parallel from the memory. A fewer number of data contacts are selectable for use, such as a single data contact 17. The maximum rate of data transfer between the host and the card is limited by the number of parallel data paths that are used. The MMC card described in the Background above has a similar contact layout and interface but omits the data pins 10 and 18 and does not use the contact 11, which is provided as a spare. The MMC card has the same dimensions and operates similarly to the SD card except that the card is only 1.4 millimeters thick and has a single data contact 17. The contacts of the card 37 are connected through respective pins 20-28 of the socket 33 to its host system. Other extensions of memory cards that are compatible with the present invention are described in U.S. patent application Ser. No. 09/924,185 filed Aug. 2, 2001, which is hereby incorporated by reference.

The present invention is based on removable electronic circuit card, such as the card 35, modified to include in addition to a memory module such as indicated at 36, an input-output module 37. The input-output module 37 communicates directly with some other system 39 over a communications path 41. The communications path 41 can be wireless, such as by use of an infrared or radio frequency signal, or can include a wired connection. If by wires, the card 35 includes an external socket to removably receive a plug that is attached to the wires. If wireless, the card 35 includes an antenna within it, if using radio frequency communication, or an infrared emitter and detector, if infra-red communications is being used. An emerging standard for radio frequency data communication has been published as the Bluetooth Specification, which is discussed by Wilson and Kronz, in two articles entitled "Inside Bluetooth Part I" and "Inside Bluetooth Part II", appearing in the issues of *Dr. Dobb's Journal* for March, 2000 (beginning at page 62) and April 2000 (beginning at page 58), which articles are incorporated herein by this reference. Other wireless schemes include those based on the 802.11 protocol, such as WiFi, and ultra-wideband (UWB) technologies. The transfer of data over the communications path 41 will usually be in two directions but can certainly be limited to one direction or the other for specific applications.

In some applications, the incident signal 41 may not explicitly originate with an external system 39. For example, the input-output module 37 could contain a photosensor or lens integrated into the card in order to function as a camera module. In this case, the signal 41 would be the incident radiation and the card would form a stand alone unit and would not need to interact through a cable or antenna with any entity but the host.

In the exemplary embodiment, the combination card 35 including the input-output module 37 is based on and compatible with the SD memory card as described in the Background. This compatibility includes mechanical, electrical, power, signaling and software. The intent of the combination card 35 is to provide high-speed data I/O with low power consumption for mobile electronic devices. A primary goal is that a combination card inserted into a non-combination card aware host will cause no physical damage or disruption of that device or its software. In this case, the combination card should simply be ignored. Once inserted into a combination card aware host, the detection of the card will be via the normal means described in version 2.11 of the MMC specification or U.S. patent application Ser. No. 09/641,023, both incorporated by reference above, with some extensions. In this state, the combination card will be idle and draw a small amount of power (15 mA averaged over 1 second). During then normal initialization and interrogation of the card by the host, the card will identify itself as a combination card device. The host software will then obtain the card information in a tuple (linked list) format and determine if the card's I/O function(s) are acceptable to activate. This decision will be based on such parameters as power requirements or the availability of appropriated software drivers. If the card is acceptable, it will be allowed to power up fully and start the I/O and function(s) built into it.

In one embodiment, I/O access differs from memory access in that the registers can be written and read individually and directly without a FAT (file access table) file structure or the concept of blocks (although block access is supported). These registers allow access to the I/O data, control of the I/O function and report on status or transfer I/O data to/from the host. The SD memory typically relies on the concept of a fixed block length with commands reading/writing multiples of these fixed sized blocks. I/O may or may not have fixed block length and the read size may be different from the write size. Because of this, I/O operations may be based on either length (byte count) or a block size.

Systems allowing the transfer of data between an external communication system and a host system via a card socket are described in European patent application EP 0891047 and International patent publication number WO 02/19266. However, the both of these depend upon a two-card structure, with an input-output card attaching to another card that in turn attaches to the card socket. European patent application EP 1 001 348 describes a memory-type card structure containing a data communication feature, but with rather limited memory and other capabilities.

One or more of a number of input-output functions may be included in the card 35, either forming a single IO module 37 or with several modules. A modem is one example, where the communicating system 39 is a telephone system. A general data transfer function likely has a high degree of usefulness because of the wide variety of types of data that users want to transfer. This includes the transfer of audio and video data, large database files, games and various other computer programs. According to a principle aspect of the present invention, such data is transferred directly between the remote system 39 and the memory module 36 without having to go through the host system 31. This is a form of direct memory access ("DMA"), and has particular advantages when long streams of data are being transferred. The host 31 need not have the hardware or software to handle such data and the communications function. This is performed entirely by the card 35. Any limitations of the host system 31 for handling high speed data transfers, a limited internal memory capacity, or the like, do not limit transfers of data directly with the memory module 36. The host 31 may, however, provide power and a clock signal to the card 35.

Although the portion of the combination memory and input-output card 35 that fits into the card socket 33 should confirm to the appropriate standard, such as that for the MMC card or SD card (described in version 2.11 of the MMC specification or U.S. patent application Ser. No. 09/641,023 both incorporated by reference above) in the exemplary embodiment, there are no particular restrictions on the size of the combination card 35 that extends beyond the socket, although it is preferable that they be made as small and light as possible. In particular, the SD card specification makes allowance for such an extension. The actual size of the extension will often be determined the nature of the I/O module 37 or modules. For example, the I/O module 37 could contain a photo-sensor to allow photographs to be stored by the card 35 in the memory module, a use that could require a larger physical size for the I/O module 37 than some of the earlier examples.

Generally, a size for the extension in plan view of less than 50 millimeters in length and 40 millimeters in width is quite convenient when formed with an insertable portion that is also less that this size. The thickness of the larger, external portion of cards may need to be made more than that of the standard SD memory cards in order to accommodate an additional number of integrated circuit chips and/or an antenna for radio frequency communication. But the extended card portion's thickness can be made less than 6 millimeters, and often less than 4 millimeters.

The exemplary embodiment of combination card 35 presents two separate modules, one memory 36 and one I/O 37, which reside together within a SD card form factor. The host 31 is capable of accessing each of the two modules separately, respectively through a memory card protocol and an I/O protocol. Block diagrams of two exemplary embodiments are shown in FIGS. 3 and 5. (In FIGS. 3 and 5, the card socket, 33 of FIG. 1, can be taken as part of the host 31.)

FIG. 3 again shows host 31 connected to a combination card 35. In this embodiment, the memory module (36 in FIG. 1) is made up of memory controller 101 and memory 103 and the IO module (37 in FIG. 1) is made up of IO controller 105 and IO element 107. Both controllers 101 and 105 are connected to the SD Card bus 43, which, among other features, is of selectable width, as is described more fully in U.S. patent application Ser. No. 09/641,023. The IO element 107 again communicates with the external system 39, here taken as a local area network (LAN) over a communications path 41. As described above, the separate modules (memory and IO) on card 35 can communicate autonomously with the host 31 through the SD Card bus 43.

First, consider the case where, although the memory and IO modules are part of the same card, no means is defined to transfer data between the two modules except through an intensive host intervention. In this case, for every bit of data transferred between the modules, the host must first be read from the source module (memory/IO) and then write it to the target module (IO/memory, respectively). This consumes time, causes SD Card bus activity that draws current, and keeps the host busy. It also would require that the host has sufficient RAM memory to buffer the data being transferred, which may not be the case in some applications. The host may have a relatively limited RAM capacity, but the described DMA process could be used to store large amounts of data in the mass storage memory of the memory module for future use in the host without it having to pass through the host. For example, large files from the internet could be downloaded through the IO module to the memory module while the host deals with other processes that are running.

More specifically, consider the case how a host 31 may use a combination card 35 for both downloading information from the LAN 39 and storing it into a mass storage flash memory of the memory 103, but without direct memory access (DMA) between the memory module and input-output module. This situation is similar to the case of when the two modules are not incorporated into a single card. In this case, each and every bit of information that the host 31 would like to download from the LAN 39 through an IO protocol, and store into the non-volatile memory 103 through the SD memory card protocol (here the SD protocol), has to be processed directly by the host 31. Particular for large amounts of data, such as music or video content, this becomes particularly inefficient. A major aspect of the present invention is the introduction of a DMA mechanism between the two modules within the combination card that dramatically decreases the host involvement in such operations.

The introduction of a DMA mechanism between the IO and memory modules in a SD or other combination card 35 has a number of advantages. Since the host 31 only initiates the data transfer, it has a minimum involvement in the actual data transfer, and hence it can deal with other tasks while the IO and memory modules transfer data amongst themselves. Also, as the SD bus 43 is idle during the data transfer, power consumption is reduced. Additionally, the DMA mechanism requires less command and response transaction, and thus the data transfer becomes faster than in the traditional way.

The basic concept of the proposed DMA mechanism is to let the host initiate the DMA data transfer, and wait for DMA completion while the card modules transfer the data between themselves. Two versions of the exemplary embodiment for a SD combination card design are presented. In the first, described with respect to FIGS. 3 and 4 and referred to here as "Bus DMA", the two modules' controllers have minimal linkage between them and are both hooked up to the SD bus. In the second, described with respect to FIGS. 5 and 6 and referred to here as "Internal DMA", the two functions (Memory and IO) are managed by one controller, which is the only entity on the card side that interfaces directly with the SD Bus.

FIG. 3 is a block diagram of the bus DMA embodiment. There are two controllers, 101 and 105, within the card that each has an interface with the SD bus 43. Data is transferred between memory 103 and IO 107 through the SD bus 43. In this embodiment, the host supplies clocks, but otherwise it is not involved in the data transfer. In this mode, although the DMA transfer may be supported in SD single bus mode, wide bus mode, or SPI mode, the bus width is preferably set to 1 bit prior to the DMA operation, in the manner described more fully in U.S. patent application Ser. No. 09/641,023. (Since the SD card uses DAT1 (described in version 2.11 of the MMC specification or U.S. patent application Ser. No. 09/641,023) to generate an interrupt upon completion of the DMA transfer, and the host may not trace the bus transactions to determine the legal interrupt period in wide bus mode.)

In this embodiment, when transferring data from LAN 39 to non-volatile mass storage memory in memory 103, data is first transferred over communications path 41 to IO 107. From there, it is transferred from IO controller 105 to memory controller 101 via SD bus 43 and then on to memory 103. As the data is transferred through the SD bus 43, the host can also access this data during the DMA transfer. This process is indicated schematically by the dotted line. Once the host instructs the card to perform the transfer, the process is performed independently of the host aside from providing a clock signal. The transfer from memory is performed in the corresponding inverse manner.

Referring to FIG. 4, the electronic system within a modified SD card 35 according to FIG. 3 is illustrated in block diagram in more detailed form. A memory controller 101 communicates with one or more memory units 103 over lines 104. The controller 101 includes a microprocessor 106 and its interface circuits 109. The interface circuits 109, in turn, are interconnected with a memory 111, SD bus/host interface circuits 113, and memory interface circuits 115. The memory unit 103 includes a controller interface 119 connected to the lines 104 and a flash memory, or non-volatile mass storage, array 121. The controller 101 and each memory unit 103 are usually provided on separate integrated circuit chips attached to and interconnected on the card's printed circuit board, but the trend is to combine more onto single chips as improving processing technology allows.

A connector schematically indicated at 123, which is connected through bus 43 to the interface 113, includes the surface contacts of the SD card that are inserted into the card socket 33 (FIGS. 1 and 2). The controller 101 controls flow of commands and data between the memory units 103 and a host to which the card is connected. The controller 101 manages operation of the memory units 103 and their communication with the host in substantially the same manner as it does in current SD cards.

In the IO module, IO controller 105 communicates with one or more IO units 107 over lines 145. The IO controller again includes a microprocessor 147 and its interface circuits 149. The interface circuits 149, in turn, are interconnected with a memory 151, SD bus/host interface circuits 153, and circuits 155 to interface with the input-output units 107. Again, the controller 105 and each IO unit 107 are usually provided on separate integrated circuit chips attached to and interconnected on the card's printed circuit board, but the trend is to combine more onto single chips as improving processing technology allows. Lines 145 are connected with a controller interface circuit 133, which, in turn, is connected with a processor interface circuit 135. A microprocessor 137 that controls operation of the input-output card, and a memory 139, are also connected with the processor interface 135. Other implementations will not have microprocessor 137 in IO unit 107, but will instead have some dedicated logic plus a set of registers that are managed by the I/O controller 105. Generally, no specific DMA element is needed as both the memory controller 101 and the I/O controller 105 will know the DMA protocol. Finally, circuits 141 are further connected with the processor interface 135 for interfacing between the processor and signals or data that are sent and/or received through a transmission device 143. If wired communication is used, the device 143 is a receptacle for a plug. If wireless using radio frequencies, the device 143 is an antenna. If wireless using infrared communication, the device 143 includes an emitter and/or detector of an infrared radiation signal. In any event, the microprocessor 137 controls the transfer of data between the device 143 and the connector 131.

An internal DMA is shown with respect to FIGS. 5 and 6. The single controller 101' executes the data transfer between the IO unit 107 and memory unit 103 internally. The SD Bus 43 can be completely idle during the DMA transfer, thereby reducing power consumption. Consequently, this is the more efficient method. The host may read the data being transferred in an internal DMA operation during the internal DMA operation, in which case one of the modules is the source of the data. To achieve that parallelism, the host should support wide bus mode interrupts, or switch the card to a single bus mode prior to the DMA operation, since the card uses DAT1 to generate an interrupt upon the internal DMA operation completion. (Again, see U.S. patent application Ser. No. 09/641,023 for bus mode details.)

In the embodiment with the internal DMA support, when transferring data from LAN 39 to non-volatile mass storage memory in memory 103, data is again first transferred over communications path 41 to IO 107. Now, however, it is transferred to memory 103 directly through controller 101' without use of SD bus 43. This process is indicated schematically by the dotted line. Once the host instructs the card to perform the transfer, SD bus 43 is idle (unless the host 31 also reads from the IO module) and the process is performed independently of the host. The transfer from memory 103 to LAN 39 is performed in the corresponding inverse manner. The lighted dotted line from controller 101' to host 31 shows the optional data read during the internal DMA process. In the case of a data write during the inverse process, this arrow would also go the other direction.

FIG. 6 shows an electronic system within a modified SD card 35 according to FIG. 5 in more detailed form. A single controller 101' communicates with one or more memory units 103 over lines 104 and one or more IO units 107 over lines 145. Memory unit 103 and IO unit 107 are the same as previously described with respect to FIG. 4. The controller 101' is similar to memory controller 101 of FIG. 4 and again includes a microprocessor 106' and its interface circuits 109', in turn, are interconnected with a memory 111', SD bus/host interface circuits 113', and memory interface circuits 115'. Controller 101' will now also include circuits 117 to interface with an input-output card. The primes are used to indicate the elements in controller 101' of FIG. 6 may differ from the similarly number elements in FIG. 4 as they may differ somewhat since functions formerly handled in IO controller 105 of FIG. 4 are now transferred to the combined controller 101'.

The controller 101', each memory unit 103, and each IO unit 107 are again usually provided on separate integrated circuit chips attached to and interconnected on the card's printed circuit board, but the trend is to combine more onto single chips as improving processing technology allows. A connector schematically indicated at 123, which is connected through bus 43 to the interface 113, includes the surface contacts of the SD card that are inserted into the card socket 33 (FIGS. 1 and 2). The controller 101' controls flow of commands and data between the memory units 103 and IO units 107 and a host to which the card is connected.

Generally, a given card will support only one of the two DMA methods. Although the embodiment of FIGS. 3 and 4 show two controllers and that of FIGS. 5 and 6 have a single controller, in practice this division may be somewhat artificial and the various functions may be distributed in various manners between different chips of the card. As elements are combined on single chips, the division between controllers will become even more a matter of convention. The principled distinguishing feature between the bus DMA and the internal DMA process is the path used between the IO module and the mass storage module; namely, in the exemplary embodiment, whether the SD bus is used.

An implementation within the exemplary SD card embodiment will now be described in more detail. To make the discussion more concrete, various commands, structures, and registers are referred to that are explained more fully in "The MultiMediaCard System Specification" versions 2.11 and 2.2 and U.S. patent application Ser. Nos. 09/185,649, 09/186,064, and 09/641,023, all of which application are incorporated by reference above.

To indicate DMA support, two bits can be assigned to a card control register for DMA method determination. For example, a '00' value in those bits could mean No DMA Support, a '01' bus DMA, and a '10' internal DMA. The host need read these bits only once and apply it to all the following DMA transactions with that card.

Within the SD Card command structure, a new command DMA_CMD is defined for the DMA process. The host shall use it when it wishes to invoke a DMA operation. An exemplary command structure is the table of FIG. 8. The first line in the table is the number of bits devoted to each of the items in the second line, that are defined as follows in this example:

S(tart bit): Start Bit. Always '0'.
D(irection): Direction. Always '1', indicates transfer from host to card.
DMA Direction: '1' means that the data is transferred from IO to Memory, '0' means that data is transferred from Memory to IO
IO Function Number: The number of the function within the IO modules the host wishes to read/write from/to the Memory module.
OP Code: Defines the IO address to '0'—fixed address, '1'—incrementing address.
IO Register Address: Start address of IO register to read or write.
Block Count: Number of data blocks to be transferred in the DMA operation.
Stuff bit: has no meaning, always '0'.
CRC 7: 7 bits of the command cyclic redundancy check (CRC).
E(nd bit): End bit, always '1'.

In the SD or MMC command structure, the command is legal when the card is in a transfer state and ready to get data transaction commands from the host, after which the card will respond with a mode appropriate response.

FIG. 7 is a flow chart describing the DMA operation of the present invention. In step 701, the host reads the DMA designation bits in the card control register to determine if and what DMA method(s) is (are) supported. Although a card can support both DMA modes, the preferred embodiments are limited to a single mode per card as this simplifies both the specification and implementation. The host sends the DMA command, DMA_CMD, to the card in step 703. This includes DMA Direction (='0' if a transfer is required from the Memory module to an IO function, or '1' if vice versa), IO Function Number set to the required IO function, OP Code (='0' if the IO address is fixed or '1' if incremental), IO Register Address (set to reflect the start IO register address), and the Block Count. The Block Count is set to reflect the number of data blocks, whose size was set beforehand through CMD16 for Memory and CMD52/53 for IO in the SD/MMC command structure.

In step 705, the card responds to the DMA_CMD. If there was any problem (e.g. illegal command), the flow terminates. The host sends a write/read command to the Memory module (CMDs 17/18 or 24/25 in the SD/MMC command structure) at step 707. Based upon the DMA type, the host determines what signals it needs to supply the card during the transfer. For example, if the method is bus DMA, the host continues to supply a clock signal to the SD bus, otherwise, it may stop the clocks.

The two modules then transfer the data between themselves at step 711, with the card indicating the process is complete at step 713. In the SD Card case, upon completion of the DMA operation, the card generates an interrupt on DAT1 line (assert to '0'). Finally, as step 715 the host reads the normal Memory and IO status (CMD13 and CMD52 in the SD/MMC command structure) to determine the completion status.

In the bus DMA embodiment based on the SD Card command structure, the handshake between the two modules, in terms of cyclic redundancy check (CRC), CRC Response and Busy indication, is the same as the handshake between a host and a card in a normal operation. The source module displays the data on the data line, followed by a CRC16 and End Bit. The target module responds with a CRC Response and busy indication. All the bus-timing definitions adhere to the regular SD bus timing.

As noted above, although the present invention has been described in the context of a SD Card embodiment, it extends to any combination memory/IO card. For example, the invention can be extended to a combination card standard the uses an internal file system, such as cards that house SmartCard controllers. In such a system, host involvement can be greatly decreased since the host can specify a DMA operation for an entire file rather than having to initiate a DMA transfer for every chunk (for example, a disk cluster or other appropriate unit for the operating system) of a file.

As also noted above, several exemplary embodiments were referenced in conjunction with documents that are incorporated by reference. One such document that is incorporated by reference is U.S. patent application Ser. No. 09/641,023, and an embodiment shown in that application as FIG. 4 is reproduced herein as FIG. 9. As shown in FIG. 9, host 51' includes a host controller 52 that interfaces differently with the memory cards' command/response lines. Separate lines 71, 73 and 75 are connected to pin 2 of respective sockets 53, 55 and 57. Each of the separate command/response lines 71, 73 and 75 is one output of switching logic 65 which operates to switch a single command/response line 67 of the controller 52 among the individual lines 71, 73 and 75 in response to a control signal from the host in a circuit 69. More details of that embodiments are described in the '023 application.

The embodiment shown in FIG. 9 can be used with the other embodiments described herein to provide a system comprising a host controller, a first controller, and a second controller, and a bus configured to exchange data and commands between the host controller and the first and second controllers. The first and second controllers can be configured to perform a direct memory access type transfer using the bus in response to a command from the host controller to perform the direct memory access type transfer, and the host controller can be operative to provide a clock signal to the bus during the direct memory access type transfer. The first and second controllers can both be part of an electronic circuit card. Also, the first controller can comprise a memory controller, and the second control can comprise an input-output controller. The system can further comprise a memory module in communication with the memory controller, wherein the memory module includes a non-volatile mass data storage portion, and an input-output module in communication with an input-output controller, the input-output module operative to communicate data between the input-output module and an external device, wherein the direct memory access type transfer is of data between the input-output module and the mass data storage portion. The bus can comprise an SD bus. Also, once the host controller provides the command to perform the direct memory access type transfer, the first and second controllers can perform the direct memory access type transfer independently of the host controller aside from the host controller providing the clock signal to the bus. In another embodiment, the system can comprise a host controller and a bus coupled to the host controller and configured for coupling to two or more controllers. The two or more controllers can include one or more input-output controllers and one or more memory controllers. Additionally, the bus can be further configured to perform data exchange between the two or more controllers and also configured to provide a clock signal during direct memory access type transfer between the two or more controllers.

Although various aspects of the present invention have been described with respect to specific embodiments, it will be understood that the invention is protected within the full scope of the appended claims.

It is claimed:

1. A system comprising:
   a host controller;
   a first controller;
   a second controller; and
   a bus configured to exchange data and commands between the host controller and the first and second controllers, wherein the first and second controllers are configured to perform a direct memory access type transfer using the bus in response to receiving a command directly from the host controller to perform the direct memory access type transfer;
   wherein host controller is operative to provide a clock signal to the bus during the direct memory access type transfer.

2. The system of claim 1, wherein the first and second controllers are both part of an electronic circuit card.

3. The system of claim 1, wherein the first controller comprises a memory controller and the second control comprises an input-output controller.

4. The system of claim 1, wherein the bus comprises an SD bus.

5. The system of claim 1, wherein once the host controller provides the command to perform the direct memory access type transfer, the first and second controllers perform the direct memory access type transfer independently of the host controller aside from the host controller providing the clock signal to the bus.

6. The system of claim 3 further comprising:
   a memory module in communication with the memory controller, wherein the memory module includes a non-volatile mass data storage portion; and
   an input-output module in communication with an input-output controller, the input-output module operative to communicate data between the input-output module and an external device;
   wherein the direct memory access type transfer is of data between the input-output module and the mass data storage portion.

7. A system comprising:
   a host controller; and
   a bus coupled to the host controller and configured for coupling to two or more controllers, wherein the two or more controllers includes one or more input-output controllers and one or more memory controllers;
   wherein the bus is further configured to perform data exchange between the two or more controllers and also configured to provide a clock signal during direct memory access type transfer between the two or more controllers; and
   wherein the two or more controllers are configured to perform a direct memory access type transfer using the bus in response to receiving a command directly from the host controller to perform the direct memory access type transfer.

8. The system of claim 7, wherein the two or more controllers are both part of an electronic circuit card.

9. The system of claim 7 further comprising:
   a memory module comprising the one or more memory controllers and a non-volatile mass data storage portion; and
   an input-output module comprising the one or more input-output controllers;
   wherein the direct memory access type transfer is of data between the input-output module and the mass data storage portion.

10. The system of claim 7, wherein the bus comprises an SD bus.

11. The system of claim 7, wherein once the host controller provides a command to perform the direct memory access type transfer, the at least two controllers perform the direct memory access type transfer independently of the host controller aside from the host controller providing the clock signal to the bus.

* * * * *